June 28, 1949.  R. M. DAVIS  2,474,303
OSCILLOGRAPHIC RECORDING APPARATUS
Filed March 13, 1947
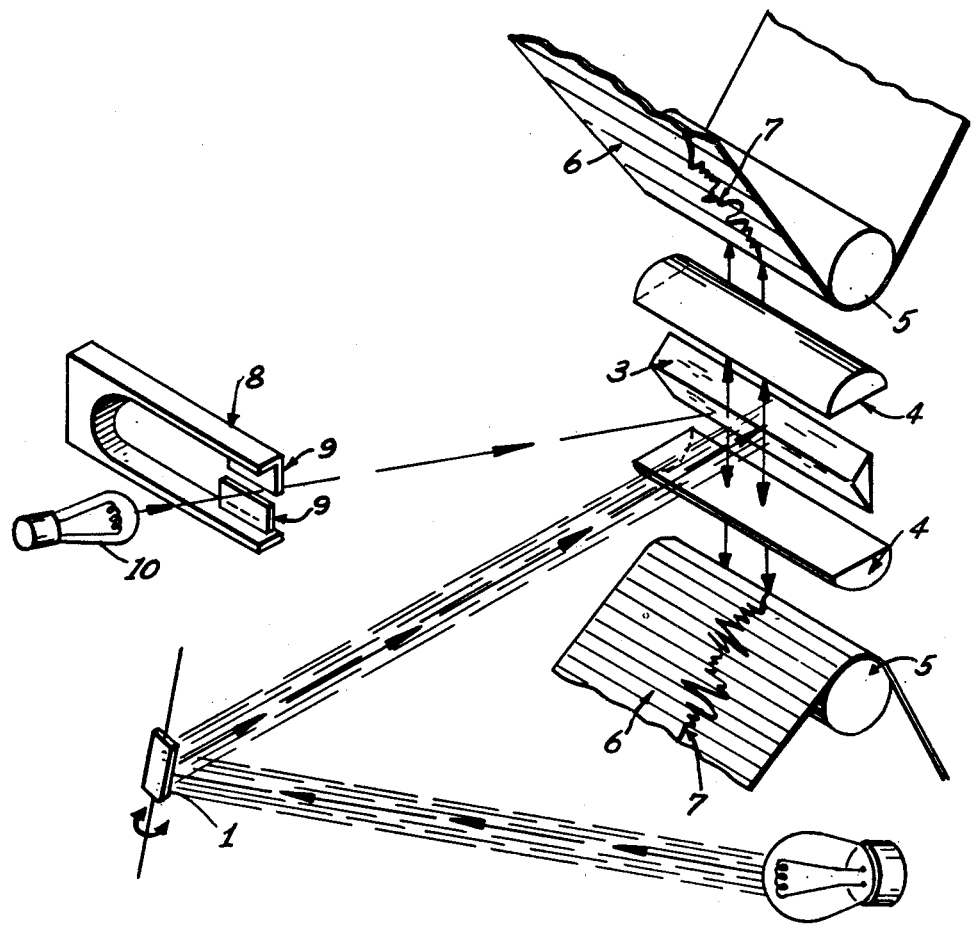
Richard M. Davis Inventor
By P. J. Whelan Attorney Patented June 28, 1949

2,474,303

UNITED STATES PATENT OFFICE 2,474,303

OSCILLOGRAPHIC RECORDING APPARATUS

Richard M. Davis, Oklahoma City, Okla., assignor to Standard Oil Development Company, a corporation of Delaware Application March 13, 1947, Serial No. 734,495

1 Claim. (Cl. 346—33)

The present invention is directed to a recording method and apparatus.

In many types of operation it is the practice to make a permanent record of a changing value. There are various ways of making such a permanent record of which one is to cause a moving beam of light, the movement of which is a function of changing values, to travel over a sensitized strip to thereby produce a trace on the strip which represents the changes of the change in value with time. It is to this type of recording method that the present invention is particularly directed.

The principal object of the present invention is the provision of a method and apparatus by which two records of a changing value can be made simultaneously. Another object of the present invention is to incorporate in the conventional system for recording a changing value by the use of a recording mirror galvanometer a simple inexpensive change by which the simultaneous production of two duplicate records is made possible.

The present method is particularly advantageous in recording systems employed in prospecting apparatus. In seismic prospecting, for example, a number of pickups are arranged at a receiving station for receiving seismic waves and converting them into electrical signals of an oscillating character. The output of each pickup is fed to a recording mirror galvanometer. The galvanometers are arranged in a bank in such a manner that their mirrors reflect light from a light source on to a moving strip of sensitized paper producing a long record carrying a number of traces corresponding to the number of galvanometers.

It is desirable to have at least two original records of the wave received at the receiving station. Where only one record is produced something may happen to it in the process of reproduction. In the past where this has happened it has been necessary to try to reproduce the shooting conditions and prepare a second record. This is a very difficult procedure because the first shot changes the local conditions in the vicinity of the shot, whereby the second shot is apt to produce a wave train different from that produced by the first shot. By the method of present production the need for a second shot is eliminated and the operator is provided with two duplicate original records.

Further objectives and advantages of the present invention will appear from the following detailed description of the accompanying drawing in which the single figure is a schematic representation in perspective of a record system according to the present invention.

Referring to the drawing in detail, numeral 1 designates a mirror of a recording galvanometer which is arranged to receive light from a light source 2. In the system of the present invention the beam of light from the galvanometer mirror travels along the apex of the elongated reflecting surface having a cross section in the form of a triangle, the surface being arranged with its apex in the plane of oscillation of the light beam. On either side of the reflector is a suitable focusing lens 4, semi-cylindrical in the embodiment shown. Suitably spaced from each focusing lens 3 is a roller 5 over which passes a strip 6 of sensitized paper. The light beam from the recording galvanometer produces a trace 7 on each of the strips 6.

There is also provided the conventional device for producing time lines on the record strip. This device comprises a shutter 8 in the light source 10 onto the apex of the reflector 3. By suitably selecting the tuning fork, the periodicity of the time lines can be fixed.

In the illustration given, for the sake of simplicity only one galvanometer is shown. It is understood that there will be in the ordinary recording system a bank of such galvanometers which will ordinarily contain from 6 to 24 galvanometers.

It will be apparent that the embodiment described is purely illustrative of the present invention and is subject to modification without departure from the concept underlying the present invention. Other systems of reflectors and lenses which make possible the splitting up of the signal and the separate recordings of its component parts will be apparent to those skilled in the art.

The nature and objects of the present invention having been thus described and illustrated, what is claimed as new and useful and is desired to be secured by Letters Patent is:

A recording apparatus consisting of a means for producing a beam of light oscillating in a fixed plane, an elongated reflector having a cross-section in the form of a triangle arranged in the direct path of said beam of light with its apex in the plane of oscillation of said light beam, a focusing lens arranged on either side of said triangular reflector with its axis parallel with the axis of said triangular reflector and means for passing a sensitized strip through the focal point of each of said focusing lenses in a direction transverse to the direction of oscillation of the light beam passing through said lenses from said reflector, whereby duplicate records are obtained.

RICHARD M. DAVIS.

REFERENCES CITED

The following references are of record in the file of this patent:

UNITED STATES PATENTS

| Number | Name | Date |
|---|---|---|
| 1,858,931 | Langevin et al. | May 17, 1932 |
| 2,147,623 | Wender | Feb. 14, 1939 |
| 2,365,613 | Wibmer et al. | Dec. 19, 1944 |

OTHER REFERENCES

General Electrical Review, vol. 45, No. 7, July 1942. Article on "High-Speed Photoelectric Recorder."